United States Patent [19]

Frost

[11] Patent Number: 4,889,351

[45] Date of Patent: Dec. 26, 1989

[54] HYDRAULIC SEAL

[76] Inventor: Stanley A. Frost, 4041 S.W. Tunnelwood, Portland, Oreg. 97221

[21] Appl. No.: 193,508

[22] Filed: May 12, 1988

[51] Int. Cl.⁴ ............................................. F16J 15/32
[52] U.S. Cl. .................................... 277/165; 277/142; 277/152
[58] Field of Search ............... 277/138, 165, 168, 169, 277/170, 171, 172, 58, 65, 188 R, 173, 174, 176, 190, 198, 199, 207 A

[56] References Cited

U.S. PATENT DOCUMENTS

| | | | |
|---|---|---|---|
| 2,784,013 | 3/1957 | Groen | 277/165 |
| 2,915,349 | 12/1959 | Gomberg | 277/165 |
| 3,727,925 | 4/1973 | Jones | 277/165 |
| 3,774,920 | 11/1973 | Sievenpiper | 277/165 |
| 4,179,131 | 12/1979 | Nussbaumer | 277/165 |
| 4,252,331 | 2/1981 | Siegel | 277/165 |
| 4,448,429 | 5/1984 | Thomas | 277/165 |
| 4,523,765 | 6/1985 | Heidemann | 277/165 |
| 4,566,703 | 1/1986 | Zitting | 277/165 |
| 4,576,386 | 3/1986 | Benson et al. | 277/165 |
| 4,579,041 | 4/1986 | Organ et al. | 277/165 |
| 4,681,327 | 6/1987 | d'Agostino et al. | 277/165 |
| 4,702,482 | 10/1987 | Oseman | 277/165 |
| 4,709,932 | 12/1987 | Edlund et al. | 277/165 |
| 4,714,259 | 12/1987 | Mack et al. | 277/165 |
| 4,723,782 | 2/1988 | Müller | 277/165 |
| 4,749,201 | 6/1988 | Hunger | 277/165 |
| 4,749,202 | 6/1988 | Bonomi | 277/165 |

FOREIGN PATENT DOCUMENTS

| | | | |
|---|---|---|---|
| 1083933 | 9/1967 | United Kingdom | 277/165 |
| 3418898 | 11/1985 | Fed. Rep. of Germany | 277/165 |

Primary Examiner—William A. Cuchlinski, Jr.
Assistant Examiner—Jeff Hohenshell
Attorney, Agent, or Firm—Kolisch, Hartwell & Dickinson

[57] ABSTRACT

A seal for a hydraulic cylinder is disclosed and includes a static seal element and a dynamic seal element, the dynamic seal element having a continuous, annular form, the form being inscribable in an annular section of a truncated cone and having an anti-extrusion portion at either end thereof.

25 Claims, 4 Drawing Sheets

HYDRAULIC SEAL

BACKGROUND OF THE INVENTION

The instant invention relates to hydraulic seals, and specifically to a hydraulic seal for a linear actuator which is constructed to prevent extrusion of the seal material under high pressure.

Until a few years ago, maximum hydraulic operating pressures were in the 2500 PSI to 3000 PSI range. At this point in time, a 5000 PSI system is not uncommon and hydraulic systems operating at 8000 PSI are present in aircraft. System pressures are beginning to exceed the tensile strength of the materials used to seal the systems. This leads to extrusion of seal material.

One technique to prevent extrusion is known as isolation wherein the size of the extrusion gap, between the piston or rod and the cylinder, is made quite small. This requires reduced tolerances and therefore, more precise machining. Another technique to prevent extrusion is to provide a dynamic seal element having a relatively large, non-elastic edge mass.

Many forms of hydraulic seals are known. One type of seal includes a static element which includes an O-ring received in a groove on a, for example, piston, and a dynamic seal which fits over the O-ring and has a substantially cylindrical cross section. Known dynamic seals are generally formed of an elastomeric material, such as urethane. Such a dynamic seal is operable to prevent extrusion in low pressure situations, however, because such a seal is made of an elastic material to facilitate installation on a piston, the very properties which permit its installation ultimately lead to extrusion and destruction of the dynamic seal under high pressure.

Another form of dynamic seal which is known includes a split ring which allows the insertion of a dynamic seal made of a substantially non-elastic material, such as glass-filled nylon, in a hydraulic cylinder. However, under higher pressures, the presence of the split in the dynamic seal provides a leak path which allows blow-by of the hydraulic fluid, thereby lessening the operating efficiency of the hydraulic unit.

To overcome the above-mentioned problems, a dynamic seal should be formed in a continuous ring of a hard material which has high tensile strength and low elasticity. The seal should have sufficient edge mass to resist extrusion in high pressure systems, or under shock loads. The seal should be suitable for installation on a piston or rod gland without the need to stretch or compress the seal material.

An object of the instant invention is to provide a seal constructed of a resilient, substantially non-elastic material having a continuous periphery.

Another object of the instant invention is to provide a seal having sufficient edge mass to resist extrusion.

A further object of the instant invention is to provide a seal which may be installed on a piston or rod gland without stretching or compressing a dynamic seal element.

Yet another object of the instant invention is to provide a static seal having a configuration which allows easy installation of a dynamic seal thereover.

Another object of the instant invention is to provide a seal which is inexpensive to manufacture, easy to install and may be installed in existing hydraulic cylinders.

SUMMARY OF THE INVENTION

The seal of the instant invention is intended for use in a hydraulic cylinder wherein one portion of the cylinder carries the seal and includes a groove having a base therein. The groove is bounded on either side thereof by lands. Another portion of the cylinder moves relative to the one portion. The seal includes a static seal element which is constructed and arranged to fit in the groove. A dynamic seal element has a continuous, annular form. The for is indescribable in an annular section of a truncated cone. The dynamic seal element is constructed and arranged to fit in the groove and to be spaced from the groove base by the static seal element.

These and other objects and advantages of the instant invention will become more fully apparent as the description which follows is read in conjunction with the drawings.

DETAILED DESCRIPTION OF THE PREFERRED EMBODIMENTS

Figure 1:
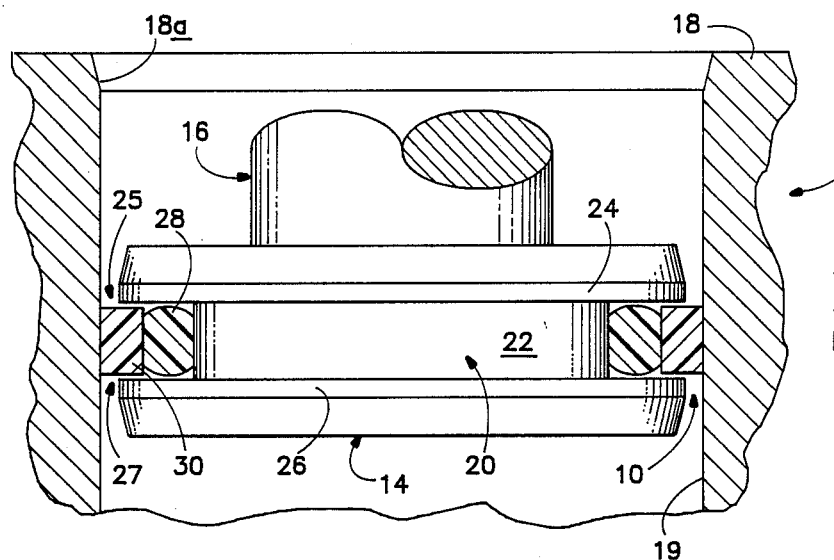
FIG. 1 is a medial cross section of a hydraulic cylinder depicting a prior art seal therein.

Turning now to drawings, and initially to FIG. 1, a prior art seal arrangement is shown generally at 10. Seal 10 is depicted in place in a hydraulic cylinder 12 which includes a piston 14, a piston rod 16 and a cylinder housing 18. In this particular depiction, piston 14 carries seal 10. The piston includes a groove 20 having a base 22 at the bottom thereof. Lands 24, 26 are located on either side of groove 20. Piston 14, also referred to herein as one portion of the hydraulic cylinder, moves relative to cylinder housing 18, also referred to herein as another portion of the cylinder. Cylinder housing 18 includes an inner wall 19 which is contacted by seal 10. The regions between lands 24, 26 and inner wall 19 are referred to as extrusion gaps 25, 27, respectively.

Seal 10 includes a static seal element 28 which takes the form of an O-ring, and a dynamic seal element 30 which is formed of a resilient, flexible material which is somewhat elastic, such as urethane, to enable installation of seal element 30 on piston 14.

Installation of seal 10 of the prior art on piston 14 would be accomplished by first installing static seal element 28 in groove 20. This is accomplished by stretching the element over land 24 or 26 and positioning it in groove 20. Next, some form of device, or in the case of small cylinders, manual manipulation thereof, would be used to stretch dynamic seal element 30 over land 26 and to seat element 30 over static seal element 28 in groove 20. Piston 14 would then be installed in cylinder housing 18. A flared section of the housing, indicated at 18a facilitates compression of dynamic seal element 30 thereby permitting insertion of piston 14 with seal 10 carried thereon into cylinder housing 18.

A seal is formed between housing 18 and piston 14 by virtue of the contact of dynamic seal element 30 with cylinder inner wall 19 and also with static seal element 28, which is in turn in a sealing relationship with piston 14. In addition to providing a seal, dynamic seal element 30 must also provide a wear surface for the relative movement between piston 14 and cylinder 18.

If dynamic seal element 30 is constructed of material which is substantially non-elastic, the dynamic seal element cannot be positioned in groove 20 because it will not stretch to slip over the lands. However, element 30 must be formed of relative strong material to withstand the wear forces generated as the piston and cylinder move relative to one another.

At high operating pressures, the dynamic seal element may be forced through extrusion gaps 25, 27 with partial or total destruction of the fabric of the dynamic seal element. A dynamic seal element which is constructed of a substantially non-elastic material is not as easily forced through the extrusion gaps as is a seal made from an elastic material. The provision of a thickened edge mass will also help to prevent extrusion of the seal material into gaps 25, 27.

Figure 2:
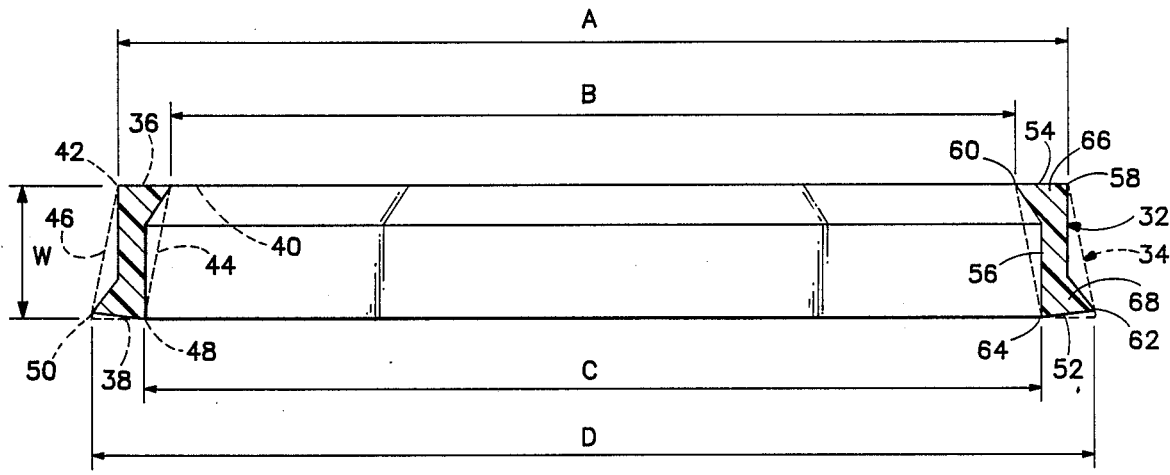
FIG. 2 is a medial cross section of a dynamic seal element constructed according to the instant invention.

Referring now to FIG. 2, a dynamic seal element 32 constructed according to instant invention is depicted. Element 32 has a continuous, annular form which is inscribable in a truncated annular conical section, depicted in dashed lines at 34. Element 32 may be constructed from a substantially non-elastic, material such as glass-filled nylon, which has excellent wearing characteristics. The shape of element 32 allows it to be positioned on piston 14 without stretching.

Conical section 34 is arranged such that the upper edge 36 thereof has relatively smaller diameters than the lower edge 38 thereof. Upper edge 36 defines an upper, inner perimeter 40 and an upper outer perimeter 42 with the inner 44 and outer 46 surfaces of the cone, respectively. Lower edge 38 and surfaces 44, 46 define a lower inner perimeter 48 and a lower outer perimeter 50, respectively.

Seal 32 has a base 52 at the larger end thereof, offset, in this embodiment, at an angle of approximately 15° from lower edge 38, and a top 54 at the smaller end thereof, coincident with upper edge 36. In this particular embodiment of the dynamic seal element of the invention, a mid-portion 56 is located intermediate the base and top. Mid-portion 56 has a lesser thickness than do the base and top portions of the seal. Seal 32 has what is referred to herein as axial asymmetry from one end thereof to the other.

Top 54 has an outside diameter A and an inside diameter B, which define top edges 58 and 60, respectively. Base 52 has an outside diameter D and an inside diameter C which define edges 62 and 64, respectively. The seal element has a height W. Diameter A is selected to be slightly larger than the inside diameter of inner wall 19. Seal element 32 expands from the thickness of mid-portion 56 to that between edges 58, 60 and 62, 64 forming what is referred to herein as anti-extrusion portions 66, 68, which have thicker cross sections then the mid-portion.

Edges 58, 60, 62 and 64 are also referred to herein as contact edges in that when installed on one portion of the hydraulic cylinder, these edges will contact the other portion of the cylinder. As described herein, the piston is referred to as the one portion while the cylinder is referred to as the other portion. It should be appreciated that the dynamic seal elements described herein may be suitable for installation in both piston grooves and at rod glands, wherein the dynamic seal element is installed in a groove formed in the cylinder housing to act on a piston rod moving therethrough.

Figure 3:
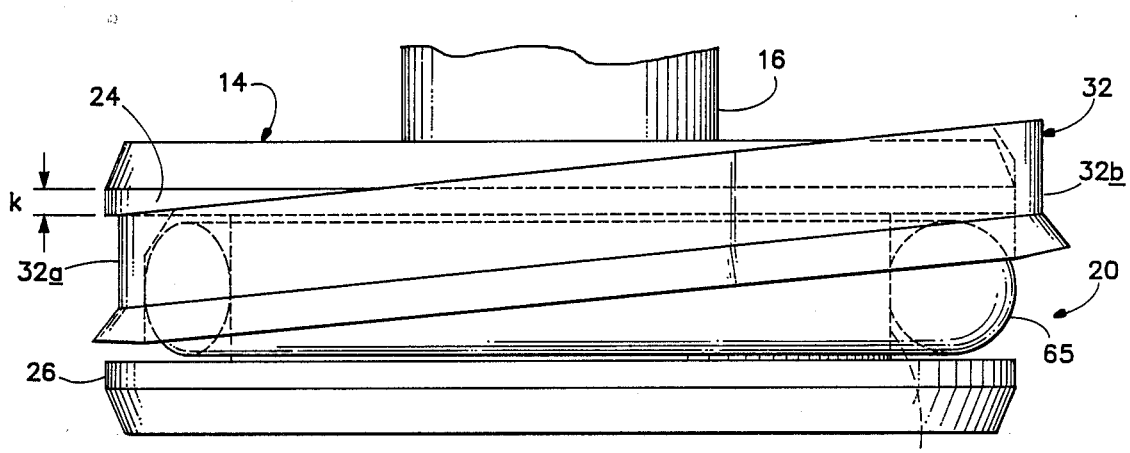
FIG. 3 is a side view of the seal of FIG. 2 partially installed on a piston.

Referring now to FIG. 3, dynamic seal element 32 is shown partially installed on piston 14. A static seal element 65, having a substantially circular cross section, is depicted as having been positioned in groove 20 in contact with base 22. Seal 32 is positioned with a side 32a thereof in groove 20, in contact with static seal element 65, which is partially deformed, at the left side of the drawing, while the other side 32b of seal 32 is slipped over land 24. Land 24 has a height of K. As previously noted, element 32 is formed of a substantially non-elastic material. The element is, however, resilient, and may be deformed, after which, it will return to its original shape and dimensions. The shape of element 32 allows it to be slipped over the piston lands while minimally deforming static seal element 65.

In practice, static seal element 65 would be manually installed on piston 14 while dynamic seal element 32 may be positioned through some type of mechanism which would assist in the placement of the dynamic seal element on the piston, such as the type of hydraulic operated machines which are currently used to install known dynamic seal elements. The shape and size of seal 32 requires less force to install than does the installation of existing dynamic seal elements.

Figure 4:
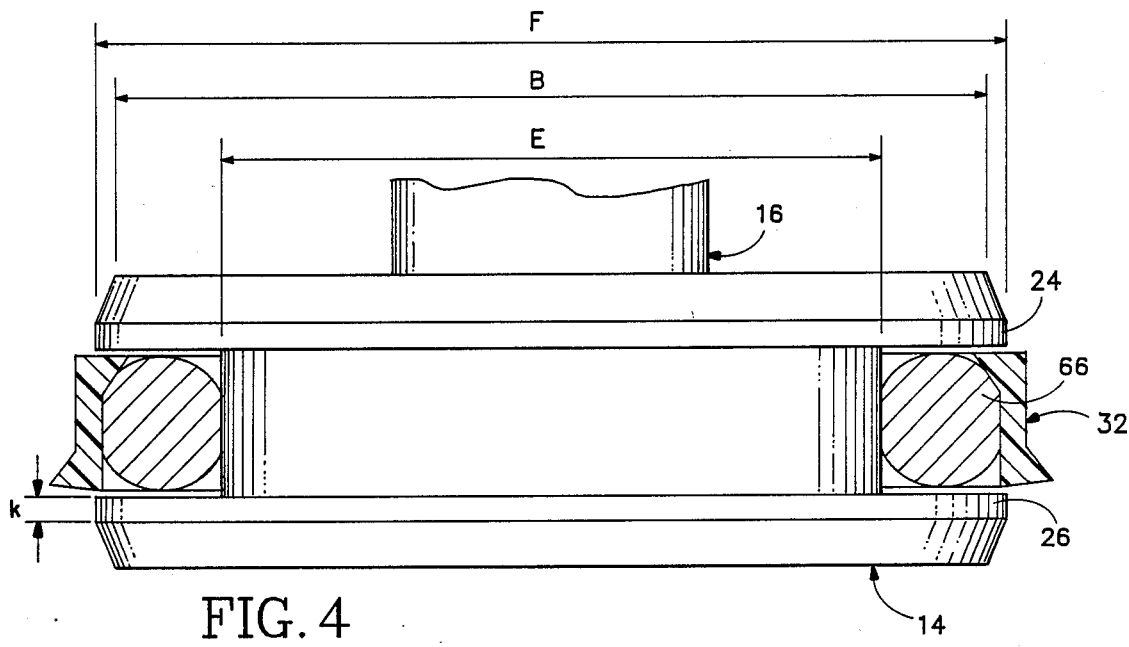
FIG. 4 is a medial cross section of the seal of the invention fully installed on a piston.

Referring now to FIG. 4, element 32 is depicted in position on piston 14. Groove 20 in piston 14 has a first predetermined diameter E at the base thereof. The lands 24, 26 on either side of groove 20 have a second predetermined diameter, F and a height of K. The relationship between seal element 32 and piston 14 is such that:

$$B^2 > \left( \frac{F-E}{2} + E \right)^2 + K^2$$

Provided that A > 10W for the dynamic seal element and that the groove depth is 3 or more times the width of the narrow end of the seal, i.e.: $(F-E) \geq 3(A-B)$.

If such relationship is satisfied, dynamic seal element 32 may be slipped over the lands on piston 14, one side of the seal slipped into groove 20, with the static seal element located therein, and the other side of seal element 32 brought into place.

Figure 5:
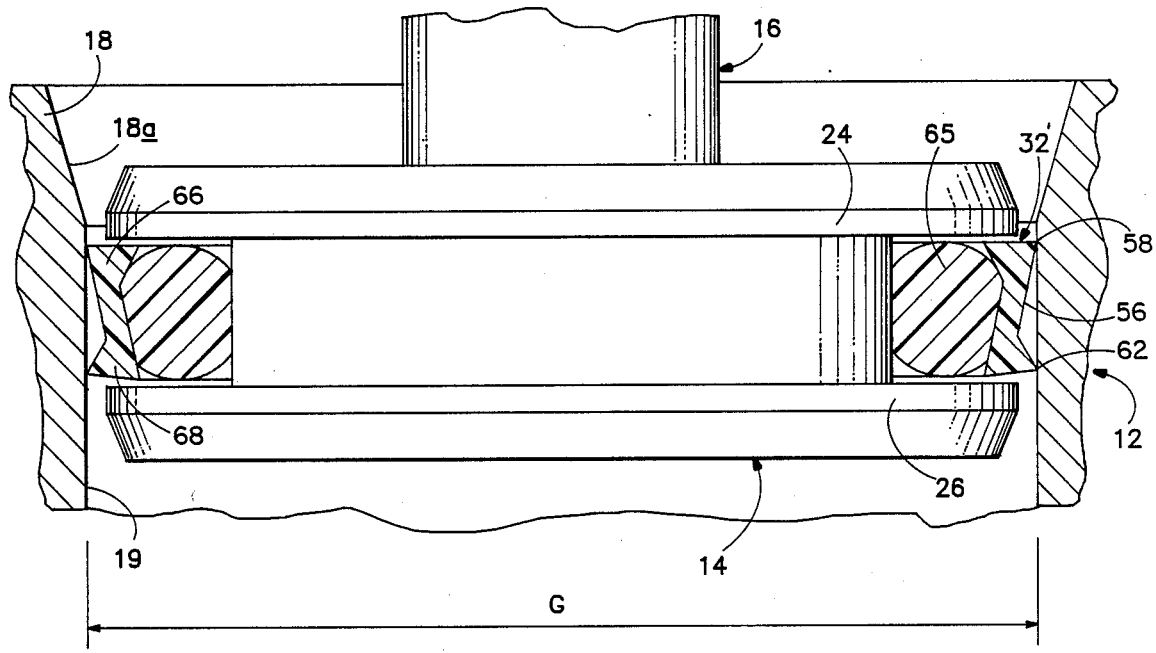
FIG. 5 is a medial cross section of the piston of FIG. 4 inserted into a cylinder.
Figure 8:
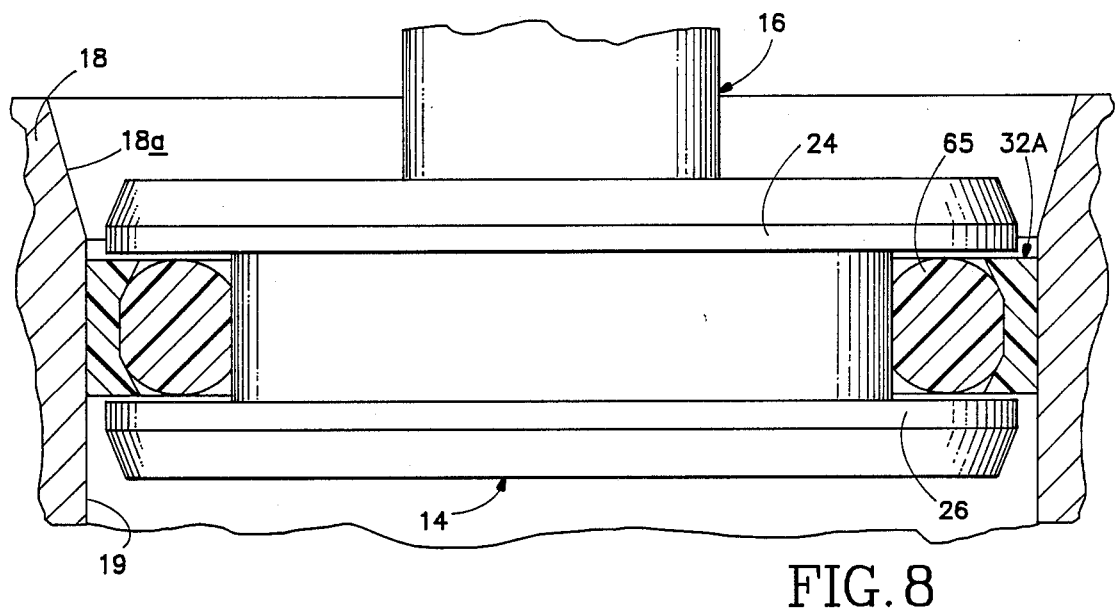
FIG. 8 is a medial cross section of the dynamic seal element of the invention after the element has been in service for an extended period of time.

Referring now to FIG. 5, piston 14, with static seal element 65 and dynamic seal element 32 carried thereon is depicted as having been inserted into cylinder housing 18, which has an internal cross section diameter of G. Element 32 is deformed by insertion into housing 18 such that top edge 58 and base edge 62, which originally had diameters A and D now have substantially equal diameters which correspond to G. As can be seen from FIG. 5, anti-extrusion portions 66, 68 are positioned with a substantial percentage of their mass received within groove 20 while forming a seal at either end thereof with the cylinder housing. Mid-portion 56 may flatten and approach or contact inner wall 19, as depicted by element 32A in FIG. 8, which represents an element which has been in use an extended period of time. The pressure on element 32A has caused anti-extrusion portion 68 to "invert", shifting its mass inwards in groove 20. Edges 58 and 62 form what are referred to herein as contact edges in that they contact inner wall 19 of housing 18.

Dynamic seal element 32, and now referring back to FIG. 2, has, in its non-deformed, original configuration, what is referred to herein as a right-angle form at its top side wherein an extension of the sides of mid-portion 56 extend to opposing perimeters of conical section 34. In this case, an extension of mid-portion 56 extends to upper outer perimeter 42 and forms a substantially right angle between the extension from the mid-portion and the top of the seal. An extension of the inner wall of mid-portion 56 extends to lower inner perimeter 64 and forms an angle with the base of the seal of approximately 75° or, 15° less than a right angle. Thus contact edges 58, 60 and 64 are coincident with perimeters 42, 40 and 48, respectively. A full right angle configuration is present in dynamic seal elements, 70, 72 and 127, depicted in FIGS. 6a, 6c and 6h, respectively.

The remaining edges at the top and base of seal 32 have an acute-angle form and contact the other opposed upper and lower perimeters. In the case of seal element 32, the edges of the element coincide with the perimeters of the conical section in which the element is inscribed. The shape of element 32 allows the presence of a thick cross section at the extrusion gap while allowing construction of the element from a non-elastic material.

Figure 6A:
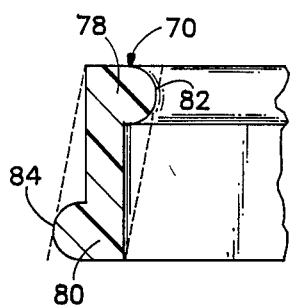
FIGS. 6a–6h represents alternate configurations of a dynamic seal of the invention.
Figure 6B:
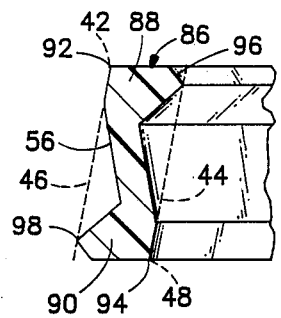
Figure 6C:
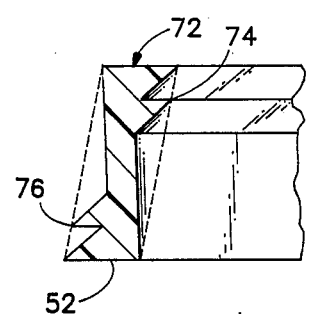
Figure 6D:
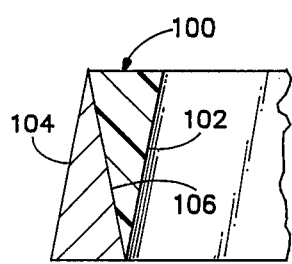
Figure 6E:
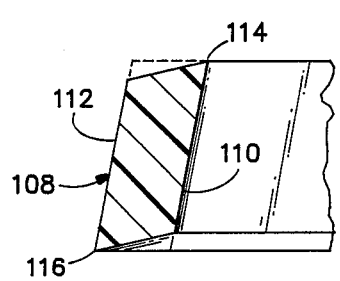
Figure 6F:
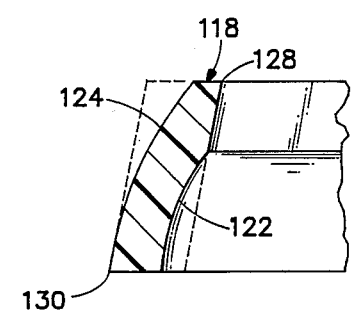
Figure 6G:
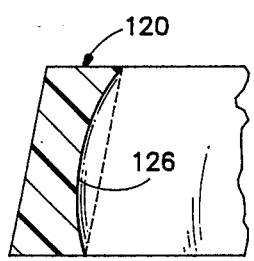
Figure 6H:
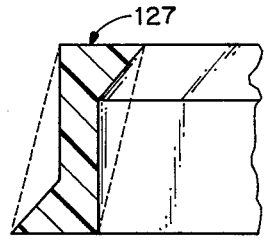

Dynamic seal elements 72 and 127, FIGS. 6c and 6h, have all edges coincidence with the perimeters of conical section 34. Seal element 72 includes plural acute angle forms having additional contact edges 74, 76 to provide multiple seal forming edges between dynamic seal element 72 and cylinder housing 18. Seal 72 would be particularly suitable in a situation where the hydraulic pressure were particularly high adjacent base 52.

Dynamic seal element 70, FIG. 6a, has rounded anti-extrusion portions 78, 80, having rounded contact edges 82, 84, respectively, carried thereon.

Dynamic seal element 86, FIG. 6b, includes a mid-portion 56 and anti-extrusion portions 88, 90 which have edges 92, 94, respectively, which are coincident with opposed perimeters 42, 48 of conical section 34. The other edges 96, 98 contact the inner 44 and outer 46 surface of conical section 34, respectively, at a point intermediate the perimeters of the conical section.

Referring now to FIG. 6d, dynamic seal element 100 is constructed to substantially fill truncated conical section 34. In the embodiment shown, two wedge-like components 102, 104 are provided which, when compressed between static seal element 65 and cylinder housing 18, will shift along their common edge 106 to substantially fill the height of groove 20.

Dynamic seal element 108, shown in FIG. 6e does not completely fill conical section 34, but does have parallel sides 110, 112 and edges 114, 116 which contact opposing upper and lower perimeters of conical section 34.

Referring now to FIGS. 6f and 6g, dynamic seal elements 118 and 120 have curved sides 122 and 124 and 126, respectively, intermediate the top and bases thereof. Seal element 118 has edges 128 and 130 in contact with opposed upper and lower perimeters of conical section 34 while dynamic seal element 120 has all four edges coincident with the perimeters of conical section 34.

The primary consideration for forming a dynamic seal element according to the invention is that the element be inscribable in a truncated, annular conical section. Another way of describing this would be a cross section of a dynamic seal element must fit within the bounds of a non-right parallelogram. In either case, the element should have at least two opposed edges which are coincident with opposed perimeters of the conical section.

The dynamic seal elements disclosed herein may also be used as dynamic rod seal elements and may be easily inserted into a groove which surrounds a rod by deforming the seal into an ellipsoid or into a tucked-ellipsoid configuration. Once the seal is received in the groove, it will return to its circular form.

As previously noted, a variety of materials may be used to form the dynamic seal elements of the invention. The following table compares materials which are known for their use in dynamic seal elements, such as urethane and TFE and 15% glass with materials which are considered suitable for use as dynamic seal elements constructed according to the invention.

| Material | Elongation | Tensile | Flexural Modulus |
| --- | --- | --- | --- |
| Urethane 92A | 300% | 5,000 | |
| TFE & 15% glass | 250% | 2,100 | 203,000 |
| Nylon & 30% glass | 4% | 23,000 | 1,200,000 |
| Nylon & 20% graphite | 4% | 28,000 | 2,400,000 |
| Acetal & 30% glass | 2% | 13,000 | 1,300,000 |

The dimensions of element 32 for use as a rod seal are selected such that diameters B and C, now referring to FIG. 2, are slightly less than the diameter of the rod which the seal acts upon.

Figure 7:
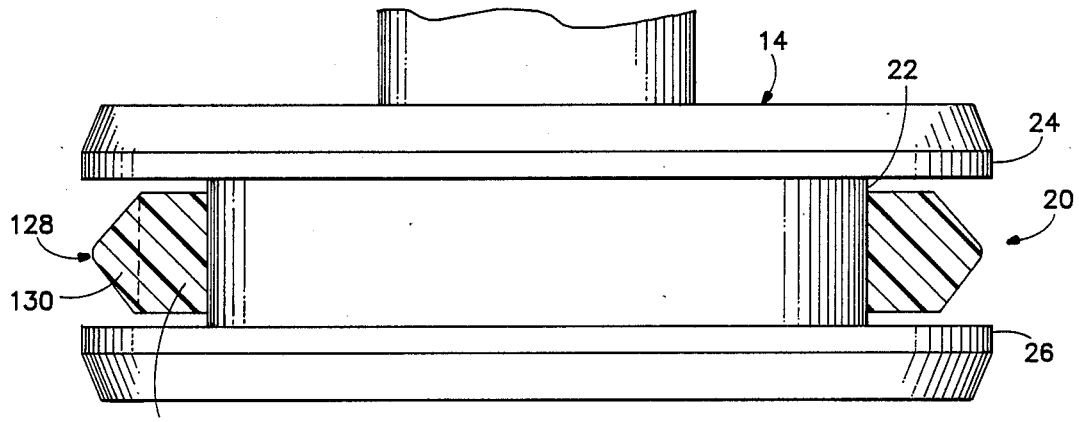
FIG. 7 is a medial cross section of a static seal constructed according to the invention.

Referring now to FIG. 7, a static seal element 128 is depicted in groove 20 of piston 14. This particular form of static seal element 128 has an outward facing triangular portion 130 carried on a rectangular portion 132. This particular configuration does not require the amount of deformation which a circular cross section seal element, such as element 65, must undergo in order to position the dynamic seal elements of the invention. The element may be formed without the rectangular portion if desired.

Thus a dynamic seal element and a static seal element, and variations thereof, have been disclosed which allow the installation of a substantially non-elastic dynamic seal element having a continuous, annular form about a piston or rod. The continuous form of the dynamic seal element eliminates the erosion and blow-by of a split seal. The dynamic seal element has an anti-extrusion portion which places the maximum seal cross section at the extrusion gaps in the cylinder to prevent seal blow out or extrusion of the seal material under high operating pressures. The provision of a substantially non-elastic material resists extrusion and provides a better wear surface than the known, softer material previously used in continuous ring seals. The axial asymmetry of the dynamic seal element allows the seal to be installed in a seal groove with little or no interference from the static seal.

The invention is not restricted to the particular embodiments which have been described, since variations may be made therein without departing from the scope of the invention as defined in the appendant claims.

It is claimed and desired to secure as Letters Patent:

1. A seal for use in a hydraulic cylinder wherein one portion of the cylinder carries the seal and includes a groove having a base therein, the groove base having a first predetermined diameter and being bounded on either side by lands having a second predetermined diameter, and another portion of the cylinder which moves relative to the one portion, said seal comprising:
- a static seal element constructed and arranged to fit in the groove; and
- a dynamic seal element having a continuous, annular form, said form being inscribable in a truncated, annular, conical section, said conical section having a larger diameter base end and a smaller diameter top end, said dynamic seal element having a base at the larger diameter end of said conical section and a top at the smaller diameter end of said conical section, said top and said base each having inside and outside diameters, wherein said top inside diameter of said conical section is greater than or equal to one-half the sum of the first predetermined diameter and the second predetermined diameter, and wherein said dynamic seal element touches at least two opposing perimeters of the conical section when inscribed therein, said dynamic seal element being constructed and arranged to fit in the groove and to be spaced from the groove base by said static seal element.

2. The seal of claim 1 wherein said dynamic seal element is constructed of a resilient, substantially non-elastic material and said static seal element is constructed of a relatively more elastic material than said dynamic seal element.

3. The seal of claim 1 wherein said dynamic seal element includes a mid-portion intermediate the base and top thereof and anti-extrusion portions at each end of said mid-portion, said anti-extrusion portions having a thicker cross-section than said mid-portion.

4. The seal of claim 3 wherein said anti-extrusion portions have a substantially right angle form on one side thereof forming opposed top and base edges and an acute angle form on the other side thereof forming the other opposed top and base edges, and wherein at least three of said edges are coincident with the perimeters of the conical section when the dynamic seal element is inscribed therein.

5. The seal of claim 3 wherein said anti-extrusion portion have a substantially right angle form on one side thereof forming opposed top and base edges and an acute angle form on the other side thereof forming the other opposed top and base edges, and wherein said right angles edges are coincident with two opposed perimeters of the conical section when the dynamic seal element is inscribed therein.

6. The seal of claim 3 wherein said anti-extrusion portions includes a circular portion thereon.

7. The seal of claim 1 wherein said dynamic seal element includes at least one curved side intermediate the top and base thereof.

8. The seal of claim 1 wherein said dynamic seal elements fills the conical section when inscribed therein.

9. The seal of claim 8 wherein said dynamic seal element includes two wedge-like components.

10. The seal of claim 1 wherein said static seal element has a circular cross section.

11. The seal of claim 1 wherein said static seal element has a cross section which includes, with the static seal element fitted in the groove, an outward facing triangular portion.

12. A seal for use in a hydraulic cylinder wherein one portion of the cylinder carries the seal and includes a groove having a base therein, the groove base having a first predetermined diameter and being bounded on either side by lands having a second predetermined diameter, and another portion of the cylinder which moves relative to the one portion, said seal comprising:
- a static seal element constructed and arranged to fit in the groove; and
- a resilient, substantially non-elastic dynamic seal element having a continuous annular form, said form being inscribable in a truncated, annular, conical section, said conical section having a larger diameter base end and a smaller diameter top end, said dynamic seal element being constructed and arranged to be fitted in said groove and spaced from the groove base by said static seal element.

13. The seal of claim 12 wherein said dynamic seal element touches at least two opposing perimeters of the conical section when inscribed therein.

14. The seal of claim 12 wherein said dynamic seal element has a base at the larger diameter end of said conical section and a top at the smaller diameter end of said conical section, said top and said base of said conical section each having inside and outside diameters, and wherein said top inside diameter is greater than or equal to one-half the sum of the first predetermined diameter; and the second predetermined diameter.

15. The seal of claim 14 wherein said dynamic seal element includes a mid-portion intermediate the base and the top thereof and an anti-extrusion portion at each end of said mid-portion, said anti-extrusion portion having contact edges thereon for contacting the other portion of the cylinder.

16. The seal of claim 15 wherein said dynamic seal element fills the conical section when inscribed therein.

17. The seal of claim 16 wherein said dynamic seal element includes two wedge-like components.

18. The seal of claim 15 wherein said dynamic seal element includes at least one curved side intermediate the top and base thereof.

19. The seal of claim 14 wherein said dynamic seal element includes a pair of contact edges adjacent the top thereof and a pair of contact edges adjacent the base thereof and wherein at least three of said contact edges coincide with the perimeters of the conical section when said dynamic seal element is inscribed therein.

20. The seal of claim 19 wherein said dynamic seal element includes one substantially right angle contact edge at each end thereof.

21. The seal of claim 20 wherein said dynamic seal element includes at least one acute angle edge at each end thereof.

22. The seal of claim 20 wherein said dynamic seal element includes plural acute angle contact edges adjacent each end thereof.

23. The seal of claim wherein said dynamic seal element includes a rounded contact edge adjacent each end thereof.

24. The seal of claim 12 wherein said static seal element has a circular cross section.

25. The seal of claim 12 wherein said static seal element has a cross section which includes, with the static seal element fitted in the groove, an outward facing triangular portion.

* * * * *